United States Patent [19]

Vesley et al.

[11] Patent Number: 4,612,242

[45] Date of Patent: Sep. 16, 1986

[54] PRESSURE-SENSITIVE ADHESIVE TAPE CONTAINING COATED GLASS MICROBUBBLES

[75] Inventors: George F. Vesley, Hudson; Patrick G. Zimmerman, St. Paul; Craig S. Chamberlain, Woodbury; Jerome W. McAllister, Hudson, all of Minn.

[73] Assignee: Minnesota Mining and Manufacturing Company, St. Paul, Minn.

[21] Appl. No.: 740,576

[22] Filed: Jun. 3, 1985

[51] Int. Cl.$^4$ .................................................. B32B 3/00
[52] U.S. Cl. .............................. 428/313.9; 427/54.1; 427/177; 427/180; 427/208; 427/215; 427/217; 428/317.5; 428/317.9; 428/325; 428/333; 428/336; 428/406; 428/428; 428/432; 428/698; 428/906
[58] Field of Search .................. 428/406, 313.9, 317.5, 428/317.9, 325, 333, 336, 428, 432, 698, 906; 427/212, 215, 217, 35, 54.1, 177, 180, 208

[56] References Cited

U.S. PATENT DOCUMENTS

| | | | |
|---|---|---|---|
| Re. 24,906 | 12/1960 | Ulrich | 206/59 |
| 3,365,315 | 1/1968 | Beck et al. | 106/40 |
| 3,826,226 | 7/1974 | Clark | 118/49.1 |
| 4,223,067 | 9/1980 | Levens | 428/308 |
| 4,239,384 | 5/1982 | Vesley et al. | 428/40 |
| 4,288,337 | 9/1981 | Ota et al. | 428/406 |
| 4,303,485 | 12/1981 | Levens | 204/159.24 |
| 4,330,590 | 5/1982 | Vesley | 428/336 |
| 4,340,642 | 7/1982 | Netting et al. | 428/406 |
| 4,353,951 | 10/1982 | Yukitoshi et al. | 428/406 |
| 4,391,646 | 7/1983 | Howell | 106/97 |
| 4,415,615 | 11/1983 | Esmay et al. | 428/40 |

*Primary Examiner*—George F. Lesmes
*Assistant Examiner*—P. R. Schwartz
*Attorney, Agent, or Firm*—Donald M. Sell; James A. Smith; Richard E. Brink

[57] ABSTRACT

The invention primarily concerns a pressure-sensitive adhesive tape, the adhesive layer of which is filled with glass microbubbles and has a dark appearance by virtue of the microbubbles having a thin-film coating having an average thickness from 0.05 to 30 nm. A preferred thin-film coating is silver which can be applied by sputtering or by vapor deposition, preferably to an average thickness of between 1 and 10 nm.

15 Claims, No Drawings

PRESSURE-SENSITIVE ADHESIVE TAPE CONTAINING COATED GLASS MICROBUBBLES

FIELD OF THE INVENTION

The invention primarily concerns pressure-sensitive adhesive tape, the adhesive layer of which contains glass microbubbles as taught in U.S. Pat. No. 4,223,067 (Levens). More broadly, the invention concerns any normally transparent article filled with glass microbubbles.

BACKGROUND ART

Foam-backed pressure-sensitive adhesive tape is commonly used to adhere an article to a substrate. The foam backings of such tapes often are pigmented with carbon black to camouflage their presence.

The above-cited Levens patent discloses a pressure-sensitive adhesive tape which has a foamlike appearance and character, even though it is not a foam, and is useful for purposes previously requiring a foam-backed pressure-sensitive adhesive tape. A foamlike tape of the Levens patent now on the market is made by ultraviolet polymerization of a layer of an adhesive-forming mixture containing colorless glass microbubbles which afford a white color that makes the tape undesirably visible in uses such as sealing a skylight or attaching body-side moldings to automotive vehicles or simulated mullion bars to a glass window. Because of its superior performance characteristics, the foamlike tape of the Levens patent is often preferred to foam-backed tapes for such purposes and would be more acceptable if its adhesive layer were sufficiently dark to camouflage the tape. If carbon black or other pigment were added to the photopolymerizable adhesive-forming mixture in amounts sufficient to produce a desirably dark appearance, this would block the ultraviolet radiation from polymerizing the mixture to a pressure-sensitive adhesive state. Up to about 0.1 or 0.15 percent by weight of carbon black can be employed without undue interference with the polymerization of a 50-micrometer layer, but this results in a pastel gray color that would be undesirably noticeable for most uses such as those mentioned above.

Glass microbubbles also are used as fillers for other polymeric articles to which they afford lighter weight in addition to advantages provided by other inert fillers, e.g., higher distortion temperatures. Lighter weight is of special importance to automotive body parts which also should be pigmented internally in order to mask from view the mechanisms which they cover.

Glass microbubbles can be made according to U.S. Pat. Nos. 3,365,315 (Beck et al.) or 4,391,646 (Howell). Individual microbubbles of the working examples of those patents are colorless.

DISCLOSURE OF THE INVENTION

The invention primarily concerns a pressure-sensitive adhesive tape which is equivalent in performance to the tape of the aforementioned Levens patent (here called the "Levens tape") and also can have a sufficently dark appearance to meet the needs mentioned above. Like the Levens tape, the pressure-sensitive adhesive tape of the invention comprises a pressure-sensitive adhesive layer which preferably has a thickness exceeding 0.2 mm and consists essentially of a polymeric pressure-sensitive adhesive matrix and glass microbubbles of an average density (ASTM D-2840-69) not exceeding 1.0 g/cm$^3$, which microbubbles comprise at least 5% by volume of the adhesive layer. Also like the Levens tape, the adhesive preferably is polymerized by ultraviolet radiation.

The tape of the invention differs from the Levens tape in that the glass microbubbles have an inorganic thin-film coating of an average thickness from 0.05 to 30 nm, but not of a thickness that would unduly inhibit polymerization of the adhesive layer by ultraviolet radiation. Nevertheless the coated microbubbles can afford surprisingly good opacity and hiding power to the tape. To give the tape a dark appearance to camouflage it, the inorganic thickness of the thin-film coating should be about one nm or greater.

The good hiding power provided by the coated glass microbubbles in part stems from their easy dispersability. When the thin-film coating is a metal, better hiding power is provided when its molar extinction coefficient is high, preferably about $10^5$, as compared to $10^3$-$10^4$ for most organic dyes and pigments.

The color the coated glass microbules afford to the tape may change with changes in thickness of the inorganic thin-film coating. For example, when a thin-film coating of silver is very thin, the coated glass microbubbles afford a yellow color, whereas increasingly thick thin-film coatings of silver provide red, dark brown, and finally tan colors.

Metals believed to be useful for the inorganic thin-film coating include aluminum, silver, tungsten, copper, chromium, zirconium, titanium, nickel, palladium, and platinum. Useful metalloid thin-film coatings include carbon and silicon. Other useful inorganic thin-film coatings include titanium nitride. All of the named metals, metalloids, and other inorganics can be applied by physical vapor deposition, e.g., by sputtering or by vapor coating. While sputtering is easier to carry out, vapor coating consumes much less energy and so should be far more economical to exploit commercially. Electroless plating, chemical vapor deposition, and other deposition techniques should also be useful.

A series of thin-film coatings of silver were sputter-deposited onto carbon-coated glass slides in thicknesses ranging from 0.5 to 8 nm. When examined by transmission electron microscopy, the coatings were discontinuous, appearing as islands, most of which were from 2 to 20 nm in breadth. It is assumed that a thin-film coating of silver of the same thickness on a glass microbubble would also be discontinuous. However, it is not known whether this discontinuity has had any role in the ability of ultraviolet radiation to penetrate a photopolymerizable composition containing the silver-coated glass microbubbles.

The morphologies of metal coatings on glass microbubbles have also been determined. Tungsten coatings of two thicknesses were sputter deposited onto glass microbubbles. These coated glass microbubbles were examined by ion scattering spectroscopy which provides a determination of elements present in the very top (two) atomic layers of the surface analyzed. For a tungsten coating of average thickness 0.3 nm, elements of the underlying glass microbubble surface (K, Ca) as well as the tungsten were detected, indicating that the tungsten coating was discontinuous. For a tungsten coating of average thickness 6.5 nm, essentially only tungsten was detected, indicating that this coating was continuous.

An inorganic thin-film coating substantially above 10 nm in average thickness might not allow sufficient ultraviolet penetration to achieve complete photopolymerization unless the microbubble-containing layer is quite thin, e.g. 0.1–0.5 mm, or its microbubble content is quite low, e.g., less than 10% by volume, in which event the inorganic thin-film coatings can be as thick as 30 nm. Even thicker inorganic thin-film coatings can be used in combination with uncoated glass microbubbles or with glass microbubbles having thinner thin-film coatings as long as the average coating thickness does not exceed 30 nm. On the other hand, the thin-film coating preferably is less than about 5 nm when the microbubble-containing layer is relatively thick, e.g., 1.5–2.5 mm, or has a high microbubble content, e.g., 50–65% by volume of the layer. Inorganic thin-film coatings which do not exceed 5 nm allow greater ultraviolet transmission and hence either faster polymerization or less energy expenditure, or both. A preferred range of thicknesses for the inorganic thin-film coatings is between 1 and 5 nm.

When the adhesive layer of the novel tape is to be photopolymerized, thin-film coatings of silver may be preferred because they are somewhat more transmissive to ultraviolet radiation than they are to visible light. Thin-film coatings of aluminum also are effective and may be preferred to silver because of much lower cost. Thin-film coatings of aluminum, nickel, tin, zinc, titanium, copper, chromium, and tungsten are roughly equally transmissive of both visible and ultraviolet radiation. However, in making a tape of the invention, it is not known whether a thin-film coating of silver passes a significantly greater proportion of ultraviolet radiation as compared to the other thin-film coatings mentioned above.

The average diameter of the coated glass microbubbles should be from 5 to 200 micrometers. Glass microbubbles having an average diameter below 5 micrometers would tend to be unduly expensive. In making tapes of the invention, it would be difficult to coat out a photopolymerized mixture containing coated glass microbubbles having an average diameter above 200 micrometers. For economy in manufacturing the glass microbubbles to be coated, their average diameter preferably is within the range of 20 to 80 micrometers.

The coated glass microbubbles may comprise from 5 to 65 volume percent of the pressure-sensitive adhesive layer or other article of the invention. It would be unduly difficult to try to make a coherent and uniform article at more than 65 volume percent, whereas the advantages from using coated glass microbubbles may not be significantly realized at less than 5 volume percent. Preferably the coated glass microbubbles comprise from 10 to 55 volume percent of the pressure-sensitive adhesive layer or other article of the invention.

The thickness of a pressure-sensitive adhesive layer or other article of the invention should exceed three times the average diameter of the coated glass microbubbles and twice the diameter of substantially every microbubble. In flexible articles such as pressure-sensitive adhesive tapes, this enhances migration of the coated glass microbubbles within the matrix under applied pressure instead of breaking. In tapes of the invention, this enables the adhesive to flow into intimate contact with rough or uneven surfaces, while retaining its foamlike character. Optimum performance in this respect is attained if the thickness of the pressure-sensitive adhesive layer or other article exceeds seven times the average diameter of the coated glass microbubbles.

As taught in the aforementioned Levens patent, microbubble-filled adhesive layers of tapes of the invention can be economically produced at thicknesses as small as 0.1 mm and as great as 2.5 mm or more. When the thickness of the adhesive layer exceeds 1.0 mm, it is desirable to coat the microbubble-filled, photopolymerizable monomers onto a carrier that transmits ultraviolet radiation so that the coating can be irradiated from both sides. The tapes are most useful at adhesive thicknesses between 0.4 and 1.0 mm.

The Levens patent teaches that the walls of its glass microbubbles should be very thin, both to enhance ultraviolet transmission and because glass microbubbles having thinner walls tend to be less expensive on a volume basis. For the same reasons, in the present invention the average density of the coated glass microbubbles preferably is less than 0.4 g/cm$^3$ and desirably less than 0.2 g/cm$^3$.

Also applicable to the manufacture of tapes of the invention are teachings of U.S. Pat. No. 4,415,615 (Esmay et al.) that tapes of the Levens patent may have a cellular pressure-sensitive adhesive matrix. See especially col. 5, lines 32–47 and Example 25. A tape of the present invention which has a cellular adhesive matrix has substantially the same darkness as a tape which is identical except having a dense adhesive matrix.

While the coated glass microbubbles by themselves afford good hiding power and can afford a desirably dark appearance where it is desired to camouflage a pressure-sensitive adhesive tape, an even darker appearance is realized when the adhesive matrix contains a dark pigment or dye in an amount that does not unduly inhibit photopolymerization by ultraviolet radiation. A preferred pigment or dye is carbon black which is especially useful in amounts ranging from about 0.04 to 0.15% by weight of the adhesive matrix, exclusive of the glass microbubbles. Another preferred pigment or dye is crystal violet dye which has an ultraviolet window between 340 and 420 nm. It also is especially useful in amounts ranging from about 0.04 to 0.15% by weight of the adhesive matrix.

The matrix of a pressure-sensitive adhesive tape of the invention preferably comprises an acrylic polymer of acrylic acid ester of nontertiary alcohol, the molecules of which have from 1–14 carbon atoms, at least a major proportion of said molecules having a carbon-to-carbon chain of 4–12 carbon atoms terminating at the hydroxyl oxygen atom, said chain containing at least about one-half the total number of carbon atoms in the molecule, said acrylic acid ester being per se polymerizable to a sticky, stretchable elastic adhesive polymer mass. In order to enhance the internal strength of the adhesive matrix, the acrylic polymer may be a copolymer of said acrylic acid ester and one or more copolymerizable monoethylenically unsaturated monomers which have highly polar groups such as are present in acrylic acid, methacrylic acid, itaconic acid, acrylamide, methacrylamide, N-substituted acrylamides, acrylonitrile, methacrylonitrile, hydroxyalkyl acrylates, cyanoethyl acrylate, N-vinylpyrrolidone, and maleic anhydride. Generally such copolymerizable monomers should be used in amounts less than 20% by weight of the adhesive matrix so that the adhesive is tacky at ordinary room temperatures, except that such tackiness can be preserved at up to 50% by weight of N-vinylpyrrolidone. Larger amounts of such copolymerizable monomers would require the novel tape to be heated to make its adhesive matrix tacky and pressure-sensitive.

The adhesive matrix may also include small amounts of other useful copolymerizable monoethylenically unsaturated monomers such as alkyl vinyl ethers, vinylidene chloride, styrene, and vinyltoluene. To further enhance the cohesive strength of the adhesive matrix, it may be made with a crosslinking agent such as 1,6-hexanediol diacrylate, with a photoactive crosslinking agent such as taught in U.S. Pat. No. 4,330,590 (vesley) and No. 4,329,384 (vesley et al.), or with a heat-activatable crosslinking agent such as a lower-alkoxylated amino formaldehyde condensate having $C_{1-4}$ alkyl groups, for example, hexamethoxymethyl melamine (available as "Cymel" 303 from American Cyanamide Co.) or tetramethoxymethyl urea (available as "Beetle" 65 from American Cyanamide Co.) or tetrabutoxymethyl urea ("Beetle" 85).

In making tapes of the invention by photopolymerization as taught in the aforementioned Levens patent, the photopolymerizable monomers may be partially polymerized to a coatable viscosity within the range of about 1000 to 40,000 cps before adding the coated glass microbubbles. Alternatively, partial polymerization can be effected by heat. Viscosities within the range of 5,000 to 15,000 cps are preferred for ease of handling. Instead of being partially polymerized, the monomers can be mixed with a thixotropic agent such as fumed silica, followed by the coating and photopolymerizing steps. Regardless of the techniques used to achieve a coatable viscosity, it is desirable after storage to stir the mixture immediately prior to coating it out to insure uniform dispersion of the microbubbles.

The microbubble-containing matrix may be coated onto and polymerized against a flexible backing sheet which has a low-adhesion surface from which the polymerized layer is readily removable and almost always is self-sustaining. If the opposite face of the backing sheet also has a low-adhesion surface, the backing sheet with its polymerized layer may be wound up in roll form for convenient storage and shipment.

In the current state of the art, photopolymerization preferably is carried out in an inert atmosphere such as nitrogen. Instead, an inert atmosphere can be achieved by temporarily covering the photopolymerizable coating with a plastic film which is transparent to ultraviolet radiation, and irradiating through that film in air. If the polymerizable coating is not covered during photopolymerization, the permissible oxygen content of the inert atmosphere can be increased by mixing into the photopolymerizable composition an oxidizable tin compound as taught in U.S. Pat. No. 4,303,485 (Levens), which also teaches that by doing so, thick coatings can be polymerized in air.

Where a tape of the invention is to be adhered to a surface to which its pressure-sensitive adhesive layer would not form a strong bond, it may be desirable to apply to one or both of its faces of its microbubble-filled adhesive layer a layer of unfilled pressure-sensitive adhesive which is specially selected for its adhesion to that surface.

The following tests were used to evaluate tapes of the invention.

SHEAR VALUE

A strip of tape is adhered by its adhesive to a rigid stainless steel plate with an exactly 1.27-cm square portion of the tape in contact with the panel. Before testing, a 1000 g weight rests over the bonded area for 15 minutes. Then the panel with the adhered tape is placed in the oven which has been preheated to 70° C., and after 15 minutes a 500 gram weight is hung from the free end of the tape, with the panel tilted 2° from the vertical to insure against any peel forces. The time at which the weight falls is the Shear Value. If no failure, the test is discontinued at 10,000 minutes. Only cohesive failures are reported.

T-PEEL

T-Peel is measured as in ASTM D-1876-72 except that the test tapes were 0.5 inch (1.27 cm) in width and were tested only two hours after being adhered to aluminum foil backings. Results are reported in Newtons per decimeter (N/dm). Only cohesive failures are reported.

DARKNESS

The darkness of a pressure-sensitive adhesive layer is determined on a Hunter LabScan Spectrocolorimeter using a 10 degree reflectance, Illum=F and the CIE lab scale (L*a*b*) where L*=0 is black and L*=100 is white. Since a* and b* are usually between −5 and +5, they are not reported unless one of them is outside of that range.

COATED GLASS MICROBUBBLES

Used to make the coated glass microbubbles of the examples (except as noted) were colorless glass microbubbles having an average density of 0.15 g/cm$^3$ and an average diameter of 40–60 micrometers. Of these, 79% by weight had a density of less than 1.0 g/cm$^3$ (average density 0.12 g/cm$^3$) and the remaining 21% had a density of more than 1.0 g/cm$^3$.

Coated Glass Microbubbles A

While being tumbled in a vacuum chamber, 150 ml of colorless glass microbubbles were sputter-coated with silver vapor from a sputtering target. The rectangular cathode (12.7 by 20.3 cm) was operated for 33 minutes in the direct current, planar magnetron mode at an applied current of 0.5 amps, with a resulting cathode potential of 420 volts. The argon sputtering gas pressure was 12 millitorr, and the background pressure was about $5 \times 10^{-5}$ torr. Based on the weight of the silver coated onto the microbubbles, the thickness of the silver coating was estimated to be one nm. The coated microbubbles had a dark purple color.

Coated Glass Microbubbles B-M

Additional batches of the colorless glass microbubbles were sputter-coated in the same manner as Coated Glass Microbubbles A except as reported in Table I. The average thickness of each thin-film coating was calculated from the weight % of metal and the average surface area of the glass microbubbles which had been measured by the BET method to be 1.67 m$^2$/g. The calculation employed the equation $$t = 10W/DS$$

wherein
t = average thickness in nm,
W = weight % of metal,
D = density of the metal in g/cm$^3$, and
S = average surface area of the microbubbles in m$^2$/g.

Coated Glass Microbubbles N

Another batch of the colorless glass microbubbles was sputter-coated in the same manner as Coated Glass Microbubbles M except that nitrogen was admitted to the chamber at a flow rate of 10 scc/min and the coating was titanium nitride.

Weight % of Metal

The weight percent of coated metal reported in Table I was determined by dissolving the coated microbubbles in dilute hydrofluoric acid in combination with other acids, namely $HNO_3$, HCl or $H_2SO_4$. The resulting solution was analyzed by Inductively Coupled Argon Plasma Atomic Emission Spectroscopy. Because uncoated microbubbles show 0.24% aluminum, this was subtracted from weight percent determination of aluminum coatings.

The final column of Table I indicates the color of individual coated glass microbubbles when viewed by a microscope at a magnification of 100X using transmitted light.

EXAMPLE 1

A syrup of coatable viscosity was prepared by partially polymerizing, as taught in U.S. Pat. No. 4,330,590 (Vesley), a mixture of 87.5 parts isooctyl acrylate, 12.5 parts acrylic acid, and 0.04 part of 2,2-dimethoxy-2-phenyl acetophenone ("Irgacure" 651). To this syrup was added an additional 0.1 part of "Irgacure" 651 and 0.05 part of hexanedioldiacrylate, plus 7.25 parts of Coated Glass Microbubbles A. The resulting mixture was thoroughly mixed slowly with an air stirrer, carefully degassed in a desiccator using a vacuum pump, and fed to the nip of a knife coater between a pair of transparent, biaxially-oriented polyethylene terephthalate films, the facing surfaces of which had low-adhesion coatings. The knife coater was adjusted to provide a coating thickness of approximately 0.10 to 0.12 mm. The composite emerging from the roll coater passed between two banks of lamps, 90% of the emissions of which were between 300 and 400 nm with a maximum at 351 nm. The exposure was measured by an International Light "Light Bug" which is spectrally responsive between 250 and 430 nm, maximum 350 nm. The composite was cooled by blowing air against both films during the irradiation to keep the temperature of the films below 85° C. to avoid wrinkling of the films.

The resulting tape was tested as tabulated in Table III (there called "Tape 5") along with other tapes which were made in the same way except that the first four tapes employed uncoated colorless glass microbubbles as used in making Coated Glass Microbubbles A, and the other tapes used various coated glass microbubbles. Tapes 6, 7, 15 and 16 differed from the others in that the

TABLE I (sputter-coated microbubbles)

| Coated Glass Micro-bubbles | Metal Coating | Batch size (ml) | Applied Current (amps.) | Potential (volts) | Deposition Rate (nm/min) | Coating Time (min) | Weight % of Metal | Average Thickness (nm) | Color |
|---|---|---|---|---|---|---|---|---|---|
| A | Silver | 150 | 0.5 | 420 | 120 | 33 | 1.79 | 1.0 | Purple |
| B | Silver | 250 | 0.25 | 376 | 60 | 5.5 | 0.13 | 0.07 | Light Tan |
| C | Silver | 200 | 0.25 | 357 | 60 | 27 | 0.70 | 0.4 | Rust Red |
| D | Silver | 200 | 1.0 | 490 | 260 | 41 | 4.14 | 2.4 | Dark Purple |
| E | Aluminum | 200 | 4.0 | 478 | 240 | 30 | 1.89 | 4.2 | Grey |
| F | Aluminum | 200 | 4.0 | 487 | 240 | 12 | 0.29 | 0.6 | Light Grey |
| G | Chromium | 150 | 4.0 | 580 | 58 | 69 | 3.67 | 3.0 | Grey |
| H | Chromium | 150 | 4.0 | 620–675 | 58 | 49 | 2.58 | 2.1 | Grey |
| I | Tungsten | 100 | 1.6 | 400–700 | 100 | 53 | 3.29 | 1.0 | Grey |
| J | Tungsten | 150 | 1.6 | 480–560 | 100 | 45 | 1.94 | 0.6 | Grey |
| K | Tungsten | 150 | 1.6 | 510–570 | 100 | 20 | 1.08 | 0.3 | Grey |
| L | Copper | 100 | 0.5 | 480 | 140 | 45 | 2.71 | 1.8 | Green |
| M | Titanium | 100 | 4.0 | 350 | 150 | 60 | 1.20 | 1.6 | Grey |
| N | Titanium nitride | 100 | 4.0 | 430 | 150 | 60 | 1.10 | 1.1 | Grey |

Coated Glass Microbubbles O

While being tumbled in a vacuum chamber with a background pressure of $2 \times 10^{-6}$ torr, 950 ml of the same colorless glass microbubbles were vapor coated with aluminum from an aluminum wire of 1.3 mm diameter which was evaporated by mechanically driving it for 7 minutes into a ceramic bar maintained at about 1400° C. The wire feed rate was 0.8 gram of aluminum per minute. Aluminum vapor from the ceramic bar was directed towards the tumbled microbubbles. Based upon the weight percent of aluminum coated onto the microbubbles, the thickness of the thin-film aluminum coating was estimated to be 2.1 nm.

Coated Glass Microbubbles P-T

Additional batches of the colorless glass microbubbles were vapor coated in the same manner as Coated Glass Microbubbles M except as reported in Table II.

TABLE II (vapor-coated microbubbles)

| Coated Glass Micro-bubbles | Metal Coating | Feed rate (g/min) | Batch size (ml) | Applied Current (amps) | Potential (volts) | Deposition Rate (nm/min) | Coating Time (min) | Weight % of Metal | Average Thickness (nm) | Color |
|---|---|---|---|---|---|---|---|---|---|---|
| O | aluminum | 0.8 | 950 | 260 | 4.6 | 2300 | 7 | 0.96 | 2.1 | Grey |
| P | aluminum | 0.8 | 950 | 260 | 4.6 | 2300 | 3 | 0.87 | 1.9 | Grey |
| Q | aluminum | 0.8 | 1900 | 290 | 5.6 | 2300 | 19 | 1.73 | 3.9 | Grey |
| R | copper | 2.0 | 1900 | 410 | >10 | 3700 | 8 | 3.14 | 2.1 | Green |
| S | copper | 2.0 | 1100 | 410 | >10 | 3700 | 18 | 4.15 | 2.8 | Grey green |
| T | copper | 2.0 | 1000 | 400–500 | >10 | 6300 | 60 | 37.5 | 25.1 | Copper |

In the following examples all parts are by weight.

polymerizable mixture comprised 90 parts isooctyl acrylate and 10 parts acrylic acid. To the syrups of some of the tapes was added carbon black as 24% solids in isobornyl acrylate (obtained from Pen Color). The carbon black solids are indicated in Table III in terms of percentage by weight of the adhesive matrix.

TABLE III

| Tape | Glass Microbubbles | Carbon black (% wgt) | Exposure (mj) | Color of Adhesive | Darkness (L*) | Shear Value (min.) | T-Peel (N/dm) |
|---|---|---|---|---|---|---|---|
| 1 | Uncoated | 0 | 1000[a] | white | 94 | 10,000 | 525 |
| 2 | " | 0.043 | " | light grey | 45 | 10,000 | 350 |
| 3 | " | 0.18 | " | dark grey | 28 | 9 | 90 |
| 4 | " | 0.18 | 1000[b] | black | 25 | 433 | 275 |
| 5 | A | 0 | " | dark brown | 21 | 10,000 | 429 |
| 6 | A | 0.043 | " | black | 18 | 1,375 | 322 |
| 7 | B | 0 | " | yellow | 76[c] | 4,150 | 409 |
| 8 | C | 0 | " | red | 40[d] | 6,990 | 445 |
| 9 | D | 0 | 700[b] | dark brown | 22 | @ | @ |
| 10 | E | 0 | 800[b] | black | 25 | 10,000 | 444 |
| 11 | F | 0 | 1000[b] | light grey | 48 | 10,000 | 411 |
| 12 | F | 0.072 | " | black | 26 | 10,000 | 339 |
| 13 | G | 0 | " | black | 19 | 10,000 | 350 |
| 14 | H | 0 | " | black | 18 | 10,000 | 316 |
| 15 | I | 0 | " | dark grey | 27 | 497 | 250 |
| 16 | J | 0 | " | grey | 36 | 10,000 | 360 |
| 17 | K | 0 | " | light grey | 54[e] | 3,875 | 397 |
| 18 | M | 0 | " | black | 23 | 10,000 | |
| 19 | N | 0 | " | black | 24 | 10,000 | |
| 20 | O | 0 | " | dark grey | 28 | 10,000 | |
| 21 | P | 0 | " | grey | 37 | 10,000 | |
| 22 | Q | 0 | " | black | 25 | @ | @ |
| 23 | Q[j] | 0 | " | black | 26 | 10,000 | 294 |
| 24 | Ex. 2 | 0 | " | dark grey | 28 | 10,000 | 364 |
| 25 | Ex. 3 | 0 | " | dark grey | 31 | 10,000 | 150 |
| 26 | Ex. 5 | 0 | " | black | 22 | 7,140 | |
| 27 | Ex. 6 | 0 | " | dark grey | 33[f] | 10,000 | |
| 28 | Ex. 7 | 0 | " | green | 39[g] | 132 | |
| 29 | Ex. 8 | 0 | " | dark brown | 23[h] | 141 | |

[a]Total exposure (irradiated from one side)
[b]Irradiated in reported amount from each side
[c]a* = 4.3; b* = 32
[d]a* = 9.3; b* = 23
[e]a* = 0.2; b* = 7
[f]a* = −0.6; b* = 7
[g]a* = −0.9; b* = 20
[h]a* = 4.9; b* = 10
[j]microbubbles 5% by weight of adhesive layer
@ not completely polymerized

EXAMPLE 2

A pressure-sensitive adhesive tape was prepared as in Example 1, except the glass microbubbles were a mixture of 5.8% by weight of Coated Glass Microbubbles Q and 1.45% by weight of the uncoated colorless glass microbubbles.

EXAMPLE 3

A coatable syrup was prepared as in Example 1, except employing 90 parts of isooctyl acrylate and 10 parts of acrylic acid. To the syrup was added a mixture of coated and uncoated microbubbles as in Example 2. To this was added 0.75% of Surfactant C and 1.0% of Surfactant B of U.S. Pat. No. 4,415,615 (see bottom of col. 7), followed by frothing and polymerizing by the "Typical Tape-making Procedure" at col. 6 of that patent. The resulting tape had an adhesive layer comprising glass microbubbles dispersed in a cellular pressure-sensitive adhesive matrix. The cellular adhesive layer had the expected foam properties and had a density of 560 kg/m³.

EXAMPLE 4

After peeling off one of the transparent films of the tape of Example 3 to expose its cellular adhesive layer, a noncellular pressure-sensitive adhesive transfer tape was laminated to the cellular adhesive layer using a hard rubber roller. The adhesive of the transfer tape was a pressure-sensitive acrylate copolymer adhesive of the type disclosed in U.S. Pat. No. Re. 24,906. Its thickness was 0.05 mm. This layer tape product was tested for 180° Peel. The Peel Value* of the laminated face was 4 N/dm and of the cellular membrane face was 11 N/dm.

*=peelback at 180° from a stainless steel plate measured by attaching the free end of the tape to a scale and moving the plate away from the scale at a rate of about 3.8 cm/sec.

EXAMPLE 5

A syrup of coatable viscosity was prepared by partially polymerizing a mixture of 70 parts of isooctyl acrylate, 30 parts of N-vinylpyrrolidone and 0.04 part of 2,2-dimethoxy-2-phenyl acetophenone ("Irgacure" 651). To this syrup was added an additional 0.1 part of "Irgacure" 651, 0.05 part of hexanedioldiacrylate, and 7.25 parts of Coated Glass Microbubbles L. This was then coated and polymerized as in Example 1.

EXAMPLES 6–8

Tapes were prepared as Example 5 except that their glass microbubbles were 8.5 parts of Coated Glass Microbubbles R, S and T, respectively.

Testing of the tapes of Examples 2–8 is reported at the end of Table III.

We claim:

1. Pressure-sensitive adhesive tape comprising a pressure-sensitive adhesive layer consisting essentially of a polymeric pressure-sensitive adhesive matrix and glass microbubbles having an average density not exceeding 1.0, which microbubbles comprise at least 5% by volume of the adhesive layer, wherein the improvement comprises:

the microbubbles have an inorganic thin-film coating of an average thickness from 0.05 to 30 nm, but not of a thickness that would unduly inhibit polymerization of the adhesive layer by ultraviolet radiation.

2. Pressure-sensitive adhesive tape as defined in claim 1 having a flexible backing sheet which has a low-adhesion surface from which the pressure-sensitive adhesive layer is readily removable.

3. Pressure-sensitive adhesive tape as defined in claim 2 wherein said pressure-sensitive adhesive layer has a cellular pressure-sensitive adhesive matrix.

4. Pressure-sensitive adhesive tape as defined in claim 2 wherein the uncoated face of the backing sheet has a low-adhesion surface, and the tape is wound upon itself in roll form.

5. Pressure-sensitive adhesive tape as defined in claim 2 including an unfilled pressure-sensitive adhesive layer on its exposed face.

6. Pressure-sensitive adhesive tape as defined in claim 5 including an unfilled pressure-sensitive adhesive layer on both faces of its microbubble-filled adhesive layer.

7. Pressure-sensitive adhesive tape as defined in claim 1 wherein the coated microbubbles comprise from 25 to 55 volume percent of the adhesive layer.

8. Pressure-sensitive adhesive tape as defined in claim 7 wherein the average thickness of the thin-film coating is from 1 to 10 nm.

9. Pressure-sensitive adhesive tape as defined in claim 8 wherein the thin-film coating is a metal selected from aluminum, silver, tungsten, copper, and chromium.

10. Pressure-sensitive adhesive tape as defined in claim 8 wherein the thin-film coating is a metalloid selected from carbon and silicon.

11. Pressure-sensitive adhesive tape as defined in claim 8 wherein the thin-film coating is titanium nitride.

12. Method of making a pressure-sensitive adhesive tape comprising the steps of (1) mixing together photopolymerizable monomers and glass microbubbles of an average density not exceeding 1.0 g/cc, which microbubbles comprise at least 5% by volume of the mixture and have an inorganic thin-film coating of an average thickness from 0.05 to 30 nm, but not of a thickness that would unduly inhibit polymerization of the monomers by ultraviolet radiation, (2) coating the mixture onto a backing sheet, and (3) subjecting the coating to ultraviolet radiation to photopolymerize the monomers to a pressure-sensitive adhesive state.

13. Method as defined in claim 12 wherein the coating is covered by a plastic film during the irradiating step, and at least one of said plastic film and backing sheet is transparent to ultraviolet radiation.

14. Method as defined in claim 13 wherein the face of the backing sheet to be coated has a low-adhesion surface from which the polymerized coating is readily removable.

15. Method as defined in claim 14 wherein both the face of the plastic film which contacts the coating and the uncoated face of the backing sheet have low-adhesion surfaces, and following step (3) are step (4) removing the plastic film and step (5) winding the backing sheet with its polymerized coating into roll form for convenient storage and shipment.

* * * * *

UNITED STATES PATENT AND TRADEMARK OFFICE
CERTIFICATE OF CORRECTION

PATENT NO. : 4,612,242

DATED : September 16, 1986

INVENTOR(S) : George F. Vesley, Patrick G. Zimmerman, Craig S. Chamberlain, Jerome W. McAllister, It is certified that error appears in the above-identified patent and that said Letters Patent is hereby corrected as shown below:

Column 5, lines 8 and 9, (vesley) both occurrences, should be -- (Vesley) --

Column 10, line 40, "4" should be -- 64 --

Signed and Sealed this

Third Day of February, 1987

Attest:

DONALD J. QUIGG

Attesting Officer

Commissioner of Patents and Trademarks